US010338938B2

(12) United States Patent
Beaumont et al.

(10) Patent No.: US 10,338,938 B2
(45) Date of Patent: Jul. 2, 2019

(54) PRESENTING ELEMENTS BASED ON CONFIGURATION OF DEVICE

(71) Applicant: Lenovo (Singapore) Pte. Ltd., New Tech Park (SG)

(72) Inventors: Suzanne Marion Beaumont, Wake Forest, NC (US); Russell Speight VanBlon, Raleigh, NC (US); Paul Plaskonos, Raleigh, NC (US); Jon Wayne Heim, Durham, NC (US); Greyson Craig Davis, Cary, NC (US); Mark David Krynock, Morrisville, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 611 days.

(21) Appl. No.: 14/204,181

(22) Filed: Mar. 11, 2014

(65) Prior Publication Data

US 2015/0261423 A1    Sep. 17, 2015

(51) Int. Cl.
*G06F 9/451* (2018.01)
*G06F 3/0481* (2013.01)
(Continued)

(52) U.S. Cl.
CPC ............ *G06F 9/451* (2018.02); *G06F 3/0481* (2013.01); *G06F 3/04817* (2013.01);
(Continued)

(58) Field of Classification Search
CPC .. G06F 3/0481; G06F 3/04817; G06F 1/1643; G06F 1/162
See application file for complete search history.

(56) References Cited

U.S. PATENT DOCUMENTS 9,658,738 B1    5/2017   Park et al.
2007/0276295 A1*  11/2007   Shugg ................. G01C 22/006
                                              600/595
(Continued)

FOREIGN PATENT DOCUMENTS

CN    102187296 A    9/2011
CN    103135688 A    6/2013
CN    103384284 A    11/2013

OTHER PUBLICATIONS

Nathan J. Peterson, Russell Speight Vanblon, Arnold S. Weksler, John Carl Mese, "Systems and Methods for Presentation of Elements on a Display Based on Context", related pending U.S. Appl. No. 15/163,904, filed May 26, 2016.
(Continued)

*Primary Examiner* — Kieu D Vu
*Assistant Examiner* — Roberto Borja
(74) *Attorney, Agent, or Firm* — John L. Rogitz; John M. Rogitz (57) ABSTRACT

In one aspect, an apparatus includes a touch-enabled display, a processor, and a memory accessible to the processor. The memory bears instructions executable by the processor to make a first determination that a device is being or has been transitioned between a laptop configuration and a tablet configuration. The instructions are also executable by the processor to, at least in part based on the first determination, make a second determination pertaining to at least one change in presentation of an element presented on the touch-enabled display from a first presentation to a second presentation.

20 Claims, 6 Drawing Sheets

(51) Int. Cl.
*G06F 9/44* (2018.01)
*G06F 1/16* (2006.01)

(52) U.S. Cl.
CPC ............ *G06F 9/4443* (2013.01); *G06F 1/162* (2013.01); *G06F 1/1615* (2013.01); *G06F 1/1618* (2013.01)

(56) References Cited

U.S. PATENT DOCUMENTS

| | | | |
|---|---|---|---|
| 2010/0223047 A1* | 9/2010 | Christ | G06F 17/276 704/4 |
| 2011/0072492 A1* | 3/2011 | Mohler | G06F 3/04817 726/3 |
| 2013/0014040 A1 | 1/2013 | Jagannathan et al. | |
| 2013/0173513 A1* | 7/2013 | Chu | G06F 9/4443 706/14 |
| 2013/0212487 A1* | 8/2013 | Cote | G06F 3/048 715/745 |
| 2013/0249785 A1* | 9/2013 | Alameh | G06F 3/0304 345/156 |
| 2014/0075385 A1* | 3/2014 | Wan | G06Q 10/1093 715/812 |
| 2014/0123022 A1* | 5/2014 | Lee | G06F 9/44505 715/747 |
| 2014/0210703 A1* | 7/2014 | Narasimhan | G06F 21/36 345/156 |
| 2014/0215201 A1* | 7/2014 | Pfeifer | G06F 9/441 713/100 |
| 2014/0289652 A1 | 9/2014 | Cai | |
| 2015/0339400 A1 | 11/2015 | Choi et al. | |
| 2016/0077715 A1 | 3/2016 | Kasterstein et al. | |
| 2016/0196048 A1 | 7/2016 | Khoury et al. | |
| 2016/0357362 A1 | 12/2016 | Gauci et al. | |

OTHER PUBLICATIONS

Nathan J. Peterson, Russell Speight Vanblon, Arnold S. Weksler, John Carl Mese, "Systems and Methods for Presentation of Elements on a Display Based on Context", related U.S. Appl. No. 15/163,904, Non-Final Office Action dated Jun. 28, 2018.

Nathan J. Peterson, Russell Speight Vanblon, Arnold S. Weksler, John Carl Mese, "Systems and Methods for Presentation of Elements on a Display Based on Context", related U.S. Appl. No. 15/163,904, Final Office Action dated Nov. 16, 2018.

Nathan J. Peterson, Russell Speight Vanblon, Arnold S. Weksler, John Carl Mese, "Systems and Methods for Presentation of Elements on a Display Based on Context", related U.S. Appl. No. 15/163,904, Applicant's response to Non-Final Office Action filed Sep. 21, 2018.

* cited by examiner

| Configuration 402 | User 404 | Application (within threshold time) 406 |
|---|---|---|
| Laptop | Johnny | Word processing |
| Laptop | Johnny | Word processing |
| Laptop | Kim | Browser |
| Tablet | Johnny | Movie Player |
| Tablet | Johnny | Movie Player |
| Tablet | Kim | Music Player |
| Tablet | Kim | Browser |

408 { first three rows }
410 { last four rows }

Convertible configuration changed; The Browser app has been selected. For this app: — 502

504 — ① Present element for this app an home screen for this configuration?
506 — Y    508 — N 510 — ② Auto-launch this app when changing to this configuration?
512 — Y    514 — N 516 — ③ Do the preceding for all other apps opened within time threshold of changing to this configuration?
518 — Y    520 — N 522 — Submit

PRESENTING ELEMENTS BASED ON CONFIGURATION OF DEVICE

FIELD

The present application relates generally to presenting elements on a display of a device based on the device being in either a laptop or tablet configuration.

BACKGROUND

So-called convertible devices are becoming more prevalent in today's marketplace. These devices typically have a laptop configuration and a tablet configuration. However, there are currently no adequate ways for determining which applications a user may find particularly useful in one configuration or the other, and often times a desired application may be difficult and cumbersome to locate and launch following a change to one configuration or the other.

SUMMARY

In one aspect, an apparatus includes a touch-enabled display, a processor, and a memory accessible to the processor. The memory bears instructions executable by the processor to make a first determination that a device is being or has been transitioned between a laptop configuration and a tablet configuration. The instructions are also executable by the processor to, at least in part based on the first determination, make a second determination pertaining to at least one change in presentation of an element presented on the touch-enabled display from a first presentation to a second presentation. The element may be associated with an application.

In another aspect, a method includes making a first determination that a device is being or has been transitioned between a laptop configuration and a tablet configuration, presenting an element in a first presentation on a touch-enabled display in response to the first determination being a determination that the device is being or has been transitioned to the tablet configuration, and presenting the element in a second presentation on the touch-enabled display in response to the first determination being a determination that the device is being or has been transitioned to the laptop configuration. The first presentation is different from the second presentation.

In still another aspect, an apparatus includes a processor and a memory accessible to the processor. The memory bears instructions executable by the processor to determine a change in physical orientation of a first portion of the apparatus relative to a second portion of the apparatus, and change the appearance of an element presented on a display at least in part responsive to the determination of a change in physical orientation of the first portion relative to the second portion.

The details of present principles, both as to their structure and operation, can best be understood in reference to the accompanying drawings, in which like reference numerals refer to like parts, and in which:

DETAILED DESCRIPTION

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The word or as used in the claims is intended to mean "or" in the disjunctive.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
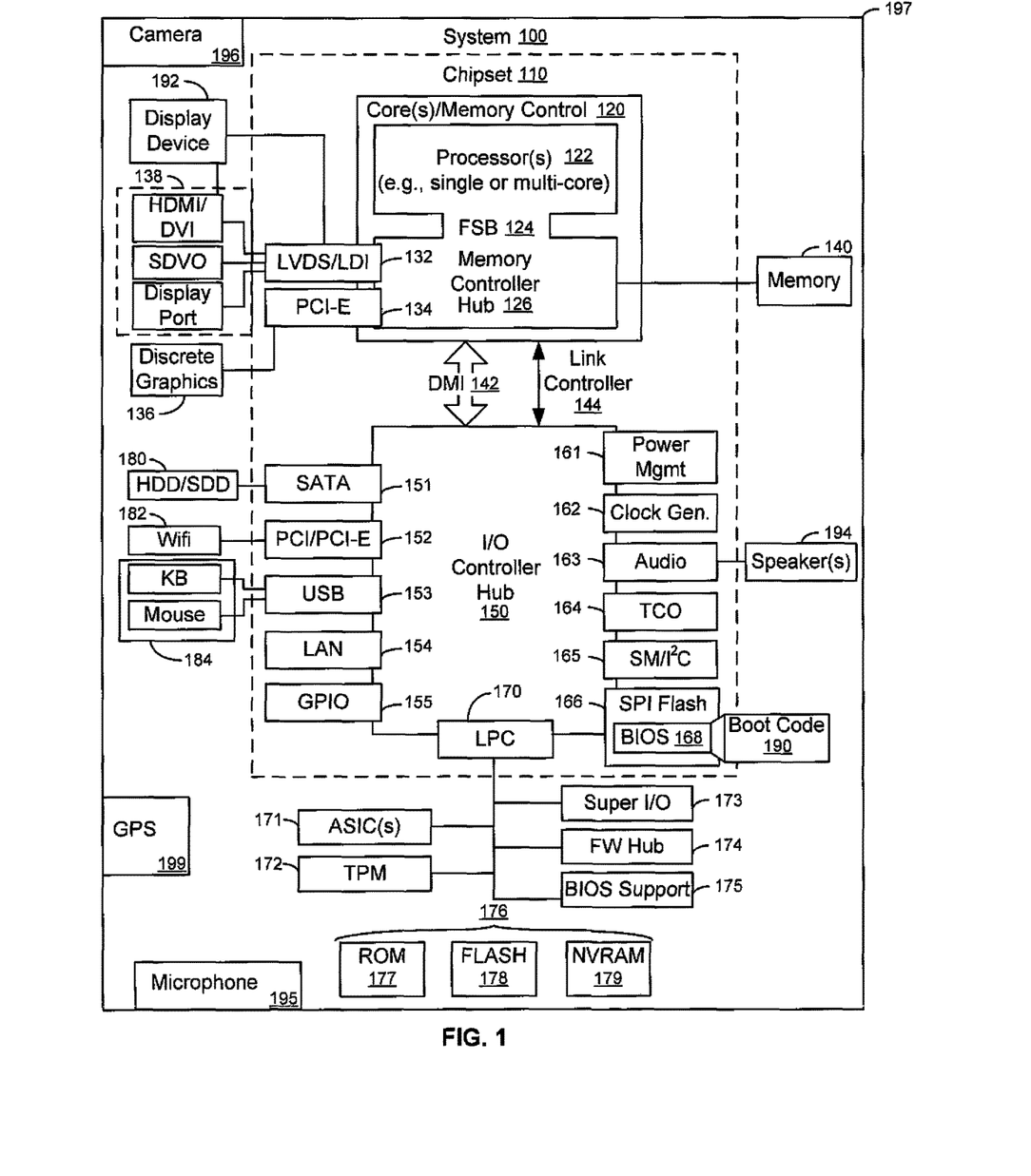
FIG. 1 is a block diagram of an example system in accordance with present principles.

Now specifically in reference to FIG. 1, it shows an example block diagram of an information handling system and/or computer system 100 such as e.g. a convertible device. However, note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 is understood to include an audio receiver/microphone 195 in communication with the processor 122 and providing input thereto based on e.g. a user providing audible input to the microphone 195. A camera 196 is also shown, which is in communication with and provides input to the processor 122. The camera 196 may be, e.g., a thermal imaging camera, a digital camera such as a webcam, and/or a camera integrated into the system 100 and controllable by the processor 122 to gather pictures/images and/or video.

Still in reference to FIG. 1, note that a GPS transceiver 199 is also shown that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
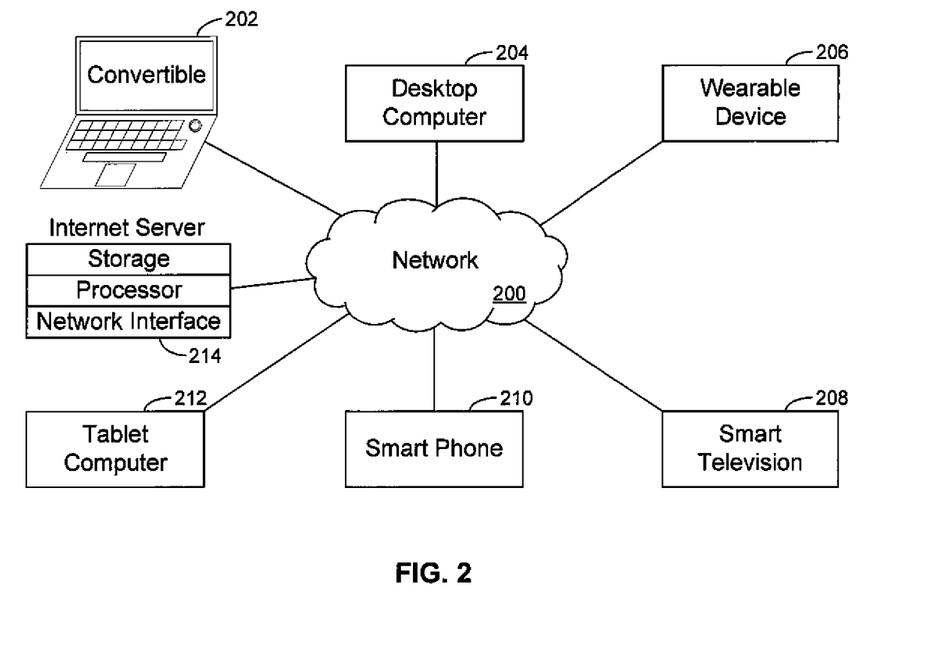
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles is shown. It is to be understood that e.g. each of the devices described in reference to FIG. 2 may include at least some of the features, components, and/or elements of the system 100 described above. In any case, FIG. 2 shows a convertible computer 202 that has e.g. a first panel bearing a display and a second panel bearing a keyboard as shown, a desktop computer 204, a wearable device 206 such as e.g. a smart watch, a smart television (TV) 208, a smart phone 2120, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
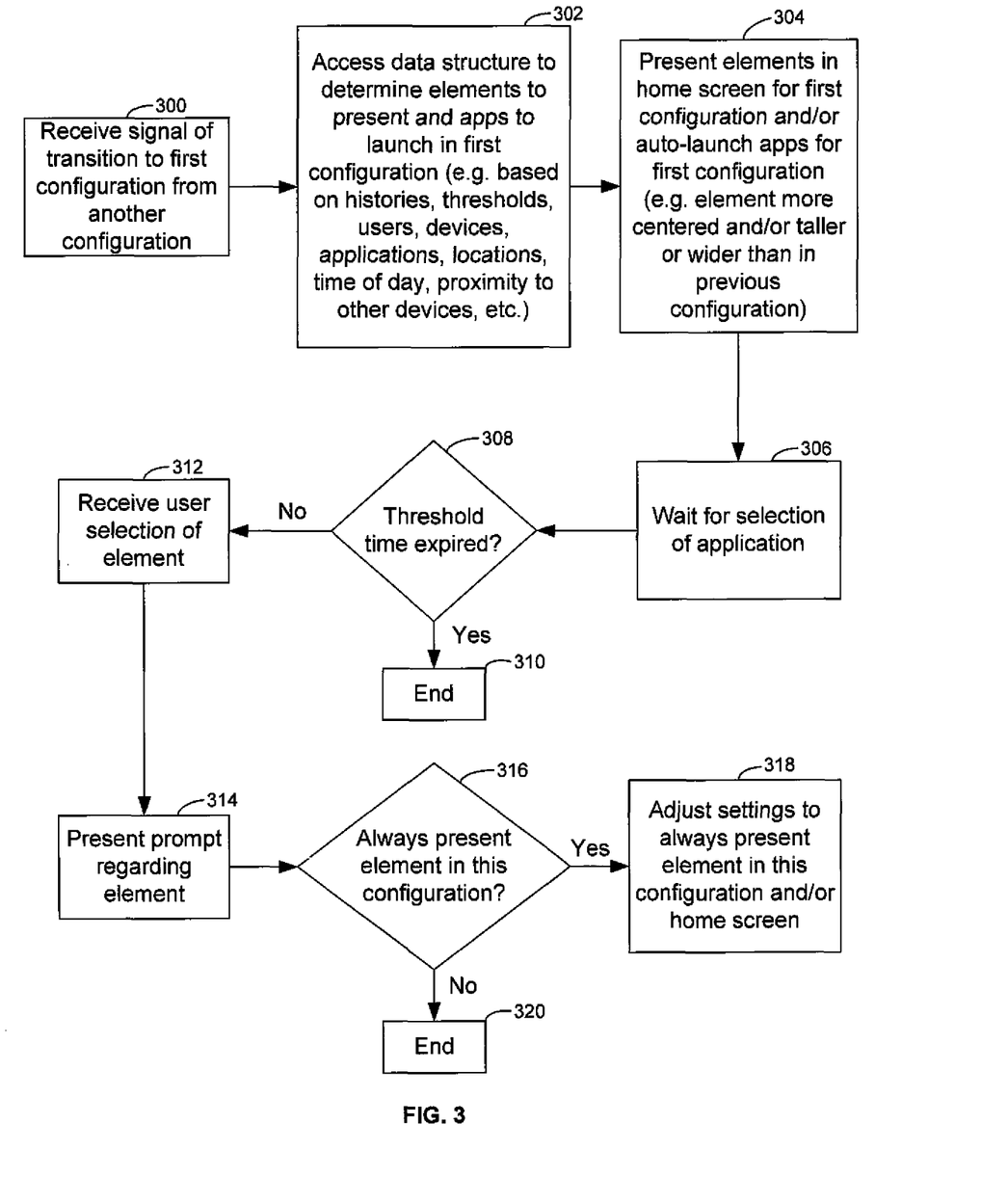
FIG. 3 is a flow chart of example logic in accordance with present principles.

Referring to FIG. 3, it shows example logic that may be undertaken by a device (e.g., a convertible device) such as the system 100 in accordance with present principles. Beginning at block 300, the logic receives at least one signal (e.g. from a motion sensor and/or sensor sensing changes in configuration of the device) indicative of the device being transitioned between two configurations of the convertible device. E.g., the signal may be representative of the device being transitioned to a laptop configuration, a tablet configuration, a tent configuration, a stand configuration, etc.

In any case, after block 300 the logic proceeds to block 302 where the logic accesses a data structure such as the one to be described further below in reference to FIG. 4 to determine one or more e.g. elements, icons, widgets, and/or toolbars to present, as well as applications to launch, in the configuration being transitioned to (referred to in reference to FIG. 3 as the "first configuration"). In accordance with present principles, the determination of which elements, icons, widgets, and/or toolbars to present, and which applications to launch, may be based on one or more of the following, which themselves may be weighted based on level of importance: histories accessible to the device (e.g. device history, application selection history, etc.), thresholds as described herein, users, devices, applications, locations (e.g. past and present device locations), time of day, proximity of the device undertaking the logic of FIG. 3 to other devices, etc.

After block 302, the logic proceeds to block 304 where the logic presents the elements (e.g. toolbars, shortcut icons, tiles respectively selectable to launch applications, etc.) on a home screen (e.g. home layout) for the first configuration, and/or automatically without further user input (e.g. other than transitioning the device to the first configuration) launches one or more applications. Elements presented on the home screen for the first configuration may even be e.g. presented relatively more central on the screen relative to at least one edge of the display, and/or the elements may be presented in at least one dimension larger than the element is presented in other home screens and/or convertible device configurations.

Continuing the description of FIG. 3, from block 304 the logic proceeds to block 306 where the logic waits for one or more selections of applications, and/or the elements that have been presented which are associated with them. The logic then proceeds to decision diamond 308 where the logic determines whether a threshold time has expired since the transition to the first configuration, which may be e.g. determined by a user as set forth further below. Regardless, an affirmative determination at diamond 308 causes the logic to end at block 310. However, a negative determination at diamond 308 instead causes the logic to proceed to block 312, at which the logic receives user selection of e.g. an element presented on the display of the device, and/or selection of an application on the device. The logic then proceeds to block 314 where the logic presents a prompt regarding the selected element, examples of which will be described further in reference to FIGS. 5 and 6.

From block 314 the logic proceeds to decision diamond 316 where the logic determines whether the selected element should always be presented (e.g. on a home screen for the first configuration) when the device is transitioned to the first configuration. The determination at diamond 316 may be made by accessing e.g. a data structure such as the one to be described in reference to FIG. 4, and then determining by parsing the data structure whether the element (e.g. including its most recent selection at block 312) has been selected a threshold number of times within the threshold time of transitioning to the first configuration to subsequently (e.g. always) be presented (e.g. on a first configuration home screen) when the device is in the first configuration, and/or then determining by parsing the data structure whether the application associated with the element has been launched a threshold number of launches within the threshold time of transitioning to the first configuration to subsequently (e.g. always) present the element associated therewith when the device is in the first configuration. But regardless of how particularly the determination at diamond 316 is made, an affirmative determination thereat causes the logic to proceed to block 318 where the logic adjusts settings for the element, the associated application, and/or the device so that the settings reflect that the element selected at block 312 is to (e.g. always) be presented when the device is transitioned to the first configuration. However, a negative determination at diamond 316 instead causes the logic to proceed to block 320 where the logic may end without so adjusting the settings.

Figure 4:
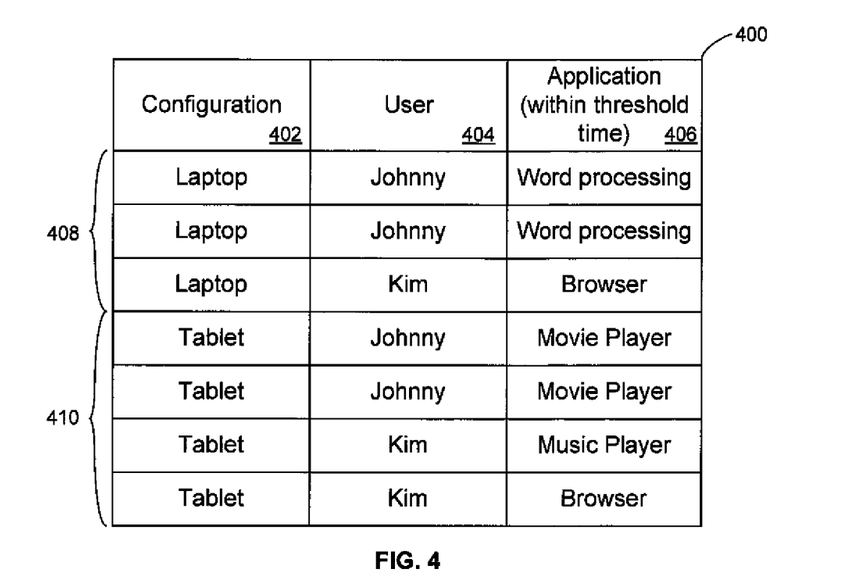
FIG. 4 is an example data structure in accordance with present principles.

Reference is now made to FIG. 4, which shows an example data structure 400 that may be e.g. stored on a tangible computer readable storage medium of the device, may be stored in cloud storage accessible to the device, etc. In any case, the structure 400 includes a first column 402 for the type of configuration (e.g. tablet, laptop, tent, stand, etc.) for which the data structure entry pertains, a second column 404 for the user for which the data structure entry pertains, and a third column 406 for one or more applications that were selected within a threshold time of the device being transitioned to the configuration respectively indicated in column 402 for each entry. As may be appreciated from the structure 400, a first portion 408 pertains to entries for the laptop configuration, while a second portion 410 pertains to entries for the tablet configuration. Thus, as an example, assume that the threshold number of selections is two for an application to be launched and/or element to be presented automatically when transitioning to a certain configuration, assume that the threshold number of selections is based on particular users and that elements to be presented and applications to be launched in accordance with present principles may be based on particular users, and assume that the device is being transitioned to the laptop configuration. The device may determine which applications to launch and/or elements to present on a home screen presentation for the laptop configuration by parsing the table 400 to locate entries as denoted in the first column for the laptop configuration, and then parse those entries to determine whether e.g. a particular user has selected any applications at least twice within the threshold time of the laptop configuration being transitioned to. In this example, by parsing the data table the logic may determine that user Johnny has selected an element associated with a word processing application, and/or launched the word processing application itself, in two previous instances (e.g. the first two entries in the structure 400 relative to the top of the structure 400), thus satisfying the threshold of two. Thus, based on the structure 400, the logic may determine that when Johnny is logged in to the device, the element associated with the word processing application should always be presented on a home screen presentation for the laptop configuration, and indeed in some instances may determine to launch the application itself based on the threshold number of two being met. As another example, note that since only one entry for the laptop configuration pertains to Kim's selection of a browser element and/or application, should Kim be the user for which the device is determining applications to e.g. always present, the threshold number of two has not been met for Kim and hence the logic would not determine to always present the browser based on that criteria.

Figure 5:
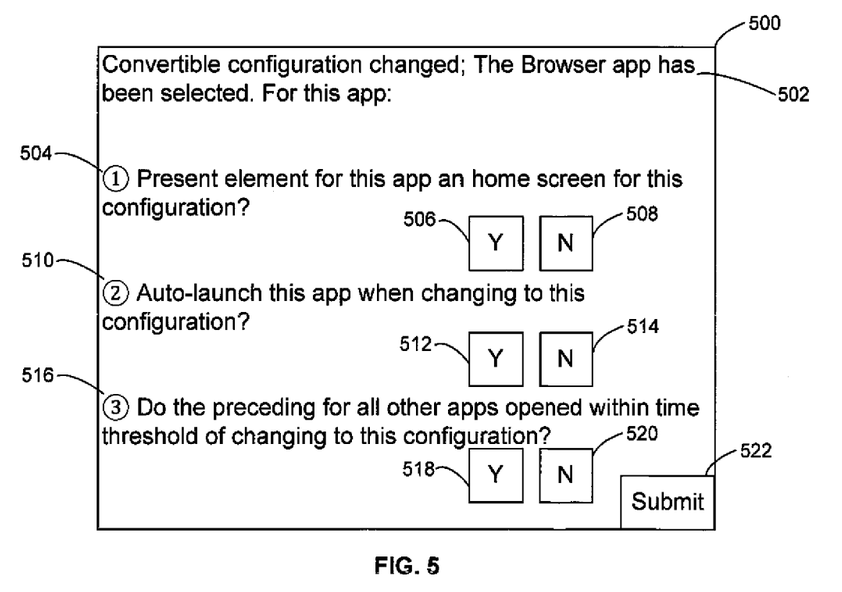
FIGS. 5-7 are example user interfaces (UIs) in accordance with present principles.

Continuing the detailed description in reference to FIG. 5, it shows an example user interface (UI) 500 including a prompt 502 which may be presented in accordance with present principles. The prompt 502 indicates that there has been a change in configuration of the (e.g. convertible) device, that one or more applications have been selected (e.g. within a threshold time of transitioning to the current configuration), and even particularly indicating which applications (in this case, e.g. a browser application). The UI 500 also includes a first section 504 for configuring the device to (e.g. always) present or not present the element associated with the browser application (e.g. that is selectable to launch the browser application) when the device is transitioned to the current configuration based on respective selection by a user of either the yes selector element 506 or no selector element 508. Also shown is a second section 510 for configuring the device to (e.g. always) launch or not launch the browser application when the device is transitioned to the current configuration based on respective selection by a user of either the yes selector element 512 or no selector element 514.

The UI 500 also includes a third section 516 for configuring the device to (e.g. always) do what the user configured the device to do for the browser application e.g. per selections of the elements 506, 508, 512, and 514 for all other applications opened within the threshold time of changing to the current configuration in accordance with present principles. Thus, a yes selector element 518 is shown for configuring the device to do so, and a no selector element 520 is shown for configuring the device to not do so. Last, note that a submit selector element 522 is shown for submitting the selections made by the user using the UI 500 to the device.

Figure 6:
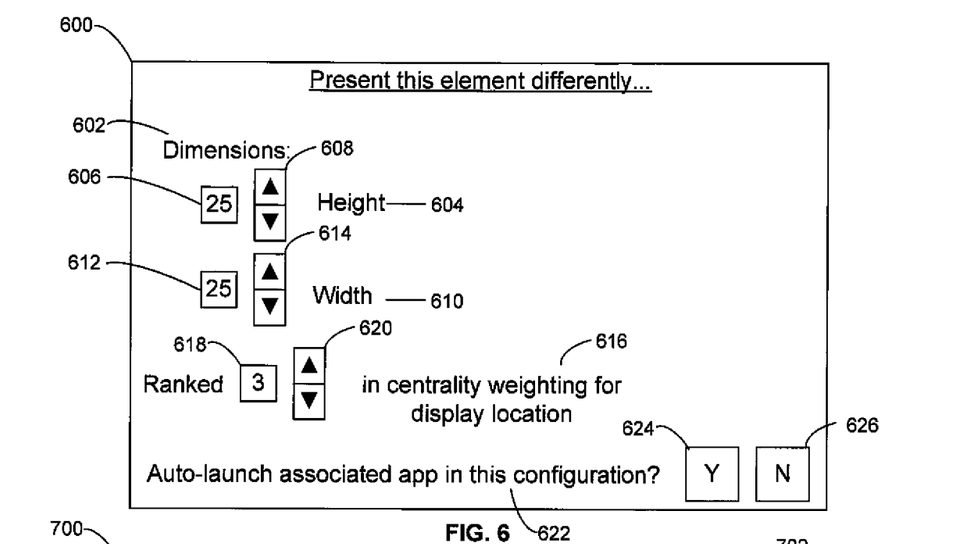

Now in reference to FIG. 6, it shows another example user interface 600, it being understood that one or more features, settings, elements, etc. from the UIs 500 and 600 may be combined into a single UI though shown separately herein for clarity. In any case, the UI 600 includes a prompt for whether a user wishes to present differently an element selected within a threshold time of the device being transitioned to its current configuration relative to e.g. how the element was presented in the transitioned-from configuration. The UI 600 thus includes a first section 602 for configuring at least one dimension of the element to be larger or smaller than in the transitioned-from configuration, with a height setting 604 shown that includes a number box 606 presenting a number for the height (e.g. in pixels, millimeters as presented on the display, etc.) along with an up/down selector element 608 manipulable to increase or decrease the number appearing tin the box 606. Also shown is a width setting 610 including a number box 612 presenting a number for the width (e.g. in pixels, millimeters as presented on the display, etc.) along with an up/down selector element 614 manipulable to increase or decrease the number appearing tin the box 612.

Note that yet another setting 616 is included on the UI 600, this one pertaining to how centrally on the display the element should be presented, as e.g. based on centrality weighting and/or rankings establishing priority of which elements should be presented more centrally than others. Thus, a number box 618 indicates that the current element to which the example UI 600 pertains is ranked third in weighting for being centrally disposed, and is accompanied by an up/down selector element 620 manipulable to move the current element up or down, respectively, in the rankings and/or weighting. Last, the UI 600 includes a setting 622 for whether to automatically launch an application associated with the current element, and thus yes and no selector elements 624, 626 for respectively configuring the device to do so or not do so are shown.

Figure 7:
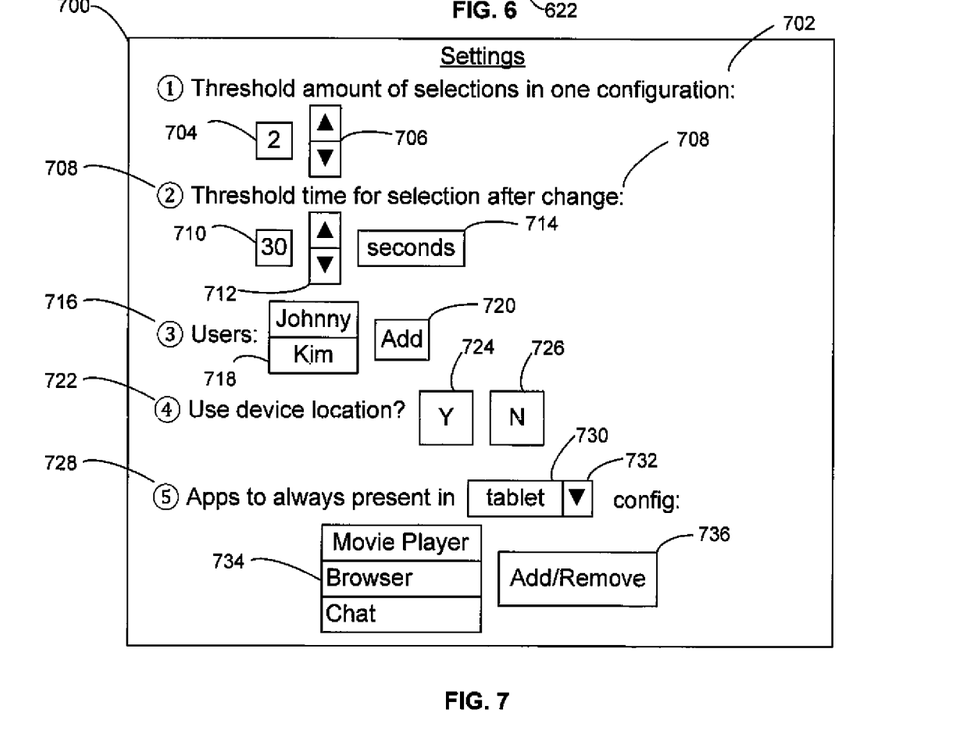

Now in reference to FIG. 7, it shows an example settings UI 700 presentable on a device in accordance with present principles. The UI 700 includes a first setting 702 for configuring the threshold amount of selections of e.g. an element or the launching of its associated application in any one (e.g. convertible) configuration in accordance with present principles. Accordingly, a number box 704 is shown for configuring the threshold number e.g. using the up/down selector element 706 manipulable to move the current number as shown in the box 704 up or down. The UI 700 also includes a second setting 708 for configuring the threshold time from change in configuration in accordance with present principles. Accordingly, a number box 710 is shown for configuring the threshold time e.g. using the up/down selector element 712 manipulable to move the current number as shown in the box 710 up or down. Also note that an increment selector element 714 is shown, which reflects that the currently operative increment is seconds (e.g. that the number in the box 710 corresponds to a number of seconds), and which is selectable to change increments to e.g. minutes, hours, etc.

Yet a third setting 716 is shown on the UI 700, this one pertaining to users for which the settings disclosed herein may apply (e.g. while not applying to others). Accordingly, a box 718 listing users for which to apply the settings is shown, along with an add selector element 720 that is selectable to add a user to the box 718 and hence apply the settings to them. Still a fourth setting 722 is shown. The setting 722 pertains to whether location information may be used in accordance with present principles, and accordingly a yes selector element 724 selectable to enable the device to use location information (e.g. GPS coordinates from a GPS transceiver on the device) is shown, as is a no selector element 726 selectable to disable the device from using location information.

In addition to the foregoing, the UI 700 may include a fifth setting 728 for configuring the device to (e.g. always) present in various configurations various elements and/or applications. Accordingly, a selector element 730 is shown for which configuration the information that follows applies, along with an arrow 732 selectable to cause a drop-down menu to be presented for toggling between configurations (e.g. laptop or tablet) for which to configure settings. Thus, in the example shown the element 730 has been configured to reflect that the information to be shortly described pertains to the tablet configuration of the device. Now describing the aforementioned "information," it may include the box 734 listing applications to be automatically launched when the device is transitioned to the tablet configuration, and/or elements associated therewith to be automatically presented on e.g. a home screen of the tablet configuration when the device is transitioned to the tablet configuration. An add/remove selector element 736 is also shown for adding or removing applications and/or elements to or from the box 734, and hence to configure the device to automatically launch and/or present them in the tablet configuration or not. Thus, it may be appreciated that in some instances, an element may be presented and an associated application launched when the device is transitioned to one configuration, whereas when transitioned to another configuration the device does not present the same element and/or launch the same associated application automatically.

Figure 8A:
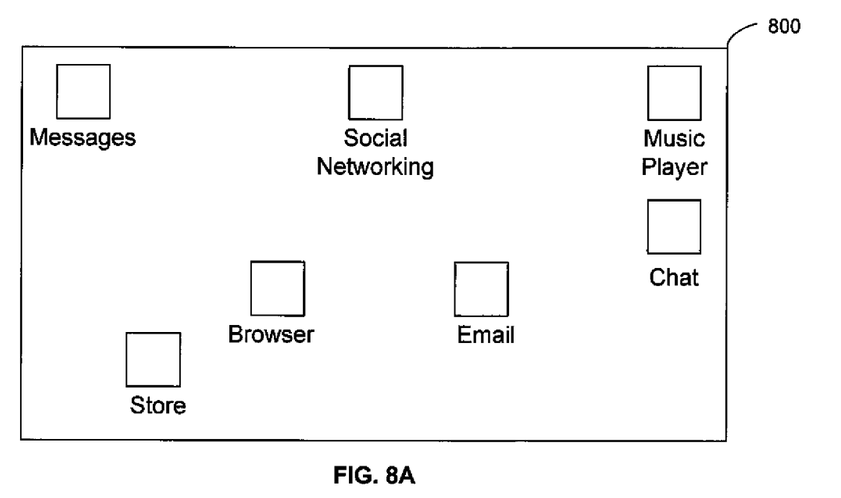
FIGS. 8A and 8B are examples of home screens of a device in accordance with present principles.
Figure 8B:
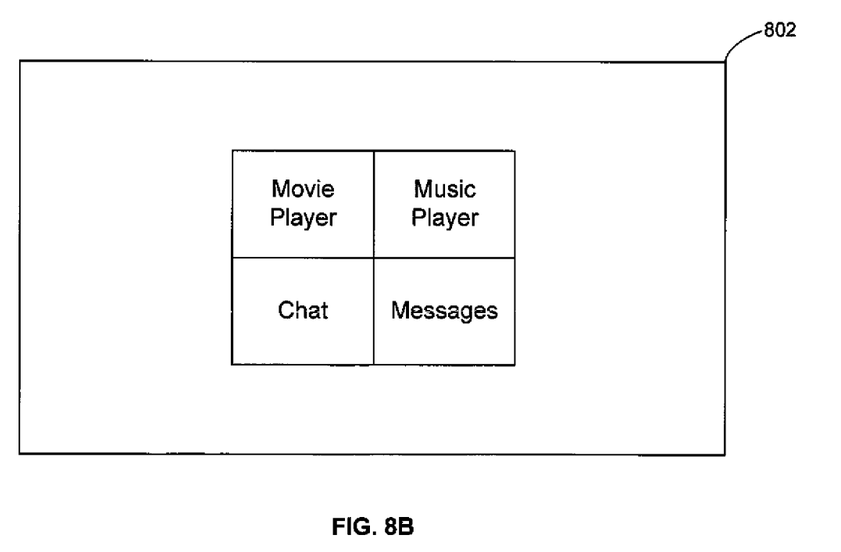

Continuing the detailed description in reference to FIGS. 8A and 8B, FIG. 8A shows an example home screen 800 for a e.g. desktop configuration of a convertible device, while FIG. 8B shows an example home screen 802 for e.g. a tablet configuration of the convertible device. As may be appreciated from the screens 800 and 802, e.g. a browser selector element is presented on the screen 800 but not the screen 802. Moreover, note that selector elements as presented on the screen 802 for the applications music player, chat, and messages are all enlarged in at least one dimension (height and width) and are also more centrally juxtaposed on the screen 802 than they are on the screen 800. What's more, note that a movie player selector element has been presented on the screen 802 but owing to the movie player application not being used in the desktop configuration a threshold number of times in accordance with present principles, a selector element for it does not appear on the screen 800. Last, note that relatively fewer selector elements are on the screen 802 relative to the screen 800 owing to those selector elements on the screen 802 being the only ones selected a threshold number of times in the tablet configuration in this example.

Without reference to any particular figure, it is to be understood that in addition to or in lieu of e.g. threshold numbers of selections within threshold times of transition to one configuration or another, still other factors may be used when determining whether to present an element and/or launch an application in accordance with present principles. For instance and as indicated above, e.g. previous and current locations of the device may be used. Providing an example of using location history and/or previous device location information, e.g. a data structure may be maintained by a device in accordance with present principles for e.g. applications launched and/or elements selected when the device is transitioned to a particular configuration at a particular location. As for current location information, e.g. the device may access information over the Internet, from a user's calendar, etc. indicating that the current location of the device is a location associated with a sporting event, and/or associated therewith at a particular (e.g. current) time, such as e.g. determining that the current location of the device is at or near the location of the Super Bowl. In such an instance, the device may determine based thereon that applications associated with the Super Bowl and optimized for touch input, and/or applications associated with at least one common piece of metadata (e.g. both the Super Bowl Internet information and the application both having metadata for "football"), should be presented when the device is transitioned to a tablet configuration at that particular location.

In addition to location and other history information, time of day may also be used to determine which applications to launch and elements to present. For instance, a data structure may be maintained by a device in accordance with present principles for e.g. applications launched and/or elements selected when the device is transitioned to a particular configuration at a particular time of day. Thus, e.g. it may be determined at least in part by accessing such a data structure that when the device is transitioned to a tablet configuration from seven to eight p.m., a movie player application has been launched a threshold number of times and hence the device may determine to automatically present the movie player application selector element on a home screen for the tablet configuration e.g. only between seven and eight p.m. each night.

Proximity to another device is yet another factor that may be used to determine which applications to launch and elements to present. For instance, a data structure may be maintained by a device in accordance with present principles for e.g. applications launched and/or elements selected when the device is proximate to another device (e.g. based on communication of GPS coordinates between the devices of their respective GPS coordinates). Thus, e.g. it may be determined at least in part by accessing such a data structure that when the device is transitioned to a laptop configuration when in proximity to another device, a game application is typically launched to play an Internet game which is also participated in by the other device, and hence the current device may determine to automatically launch the game application when the device is configured in the laptop configuration e.g. only when the other device is proximate (e.g. within a threshold distance).

Still without reference to any particular figure, it is to be understood that logic steps in accordance with present principles (e.g. determining whether a change in appearance of one or more elements should be made e.g. based on the configuration of the device (e.g. tablet, tent, stand, and/or laptop configuration)) may in some embodiments also include enabling and/or disabling applications (e.g. altogether) when they are determined to not be used in a certain configuration of the device, ignoring input from sensors on the device where data therefrom e.g. will not be used by one or more applications and/or elements presented in a different configuration of the device that is transitioned to, determining whether to process or ignore user input to the device based on the configuration of the device (and/or applications that have been automatically launched and/or elements that have been automatically presented in accordance with present principles). For example, input to a touch pad of the device that is typically used in a laptop configuration may be ignored altogether when the device is in a tablet configuration. As another example, a device in accordance with present principles may ignore input from a microphone or camera if the device determines that the camera and/or microphone is now facing away from a user when a different configuration is transitioned to, and/or is facing a desk or covered up, etc.

It may now be appreciated that present principles may be used to e.g. detect physical device modes and tie at least one potential user action to each mode. Thus, a user's actions before and/or after going into each mode may be recorded and/or stored for further use in accordance with present principles, and thus during future mode switches the device may suggest one or more applications accordingly. As an example in accordance with present principles, suppose there are multiple actions that a user takes in a certain mode, tiles, shortcuts, and home screens may all be customized based on the device being configured in that mode and what actions the user typically takes in that mode. As another example, if a user typically launches a Netflix application while in a tent mode for the device after five p.m. a threshold number of days, the device may "learn" this and then in the future the device may auto-launch Netflix upon the device's configuration in the tent mode (it also being noted that should the device be configured in a tent mode at noon rather than after five p.m., the Netflix application may not be auto-launched). As but another example, if a user only uses a subset of applications in a certain mode, those applications may be juxtaposed by the device on the main screen and/or home screen when the device is configured in that mode.

Before concluding, it is to be understood that although e.g. a software application for undertaking present principles may be vended with a device such as the system 100, present principles apply in instances where such an application is e.g. downloaded from a server to a device over a network such as the Internet.

While the particular PRESENTING ELEMENTS BASED ON CONFIGURATION OF DEVICE is herein shown and described in detail, it is to be understood that the subject matter which is encompassed by the present application is limited only by the claims.

What is claimed is:

1. An apparatus, comprising:
   a touch-enabled display;
   a processor; and
   storage accessible to the processor and bearing instructions executable by the processor to:
   make a first determination that a device is being or has been transitioned between a laptop configuration and a tablet configuration; and
   at least in part based on the first determination, make a second determination pertaining to at least one change in presentation of an element presented on the touch-enabled display relative to its presentation prior to the first determination, the element associated with an application, the change in presentation being from a first presentation to a second presentation;
   wherein the instructions are executable by the processor to make the second determination at least in part based on a third determination that the application has launched a threshold number of launches each following a transition to one of the laptop configuration and tablet configuration.

2. The apparatus of claim 1, wherein the instructions are executable by the processor to:
   at least in part based on the second determination, present the element in the second presentation.

3. The apparatus of claim 2, wherein the instructions are executable by the processor to automatically launch the application without further user input to launch the application.

4. The apparatus of claim 1, wherein the instructions are executable by the processor to determine the at least one change in presentation of the element at least in part based on proximity of at least one device other than the apparatus.

5. The apparatus of claim 1, wherein the instructions are executable by the processor to determine the at least one change in presentation of the element at least in part based on a history associated with the application.

6. The apparatus of claim 1, wherein the element is selected from the group consisting of: a tile, an icon, a widget, a toolbar.

7. The apparatus of claim 1, wherein the application is associated with the tablet configuration;
   wherein the first determination is selected from the group consisting of: a determination that the apparatus is being transitioned to the tablet configuration, a determination that the apparatus has been transitioned to the tablet configuration;
   wherein the second determination is to present the element in the second presentation; and
   wherein the element is not presented in the first presentation.

8. The apparatus of claim 1, wherein the threshold number of launches is established by based at least in part on user input indicating the threshold number of launches as received via a user interface (UI) presented on the touch-enabled display.

9. The apparatus of claim 1, wherein the instructions are executable by the processor to:
   present a user interface (UI) on the touch-enabled display, the UI comprising an option enabling selection of one or more applications associated with respective elements presentable on the touch-enabled display;
   wherein based on selection from the UI of the one or more applications, the respective elements are presented on the touch-enabled display responsive to the first determination of the device transitioning between the laptop configuration and the tablet configuration.

10. The apparatus of claim 1, wherein the instructions are executable by the processor to:

presenta user interface (UI) on the touch-enabled display, the UI comprising an option to configure a setting regarding whether to automatically launch the application responsive to the first determination.

11. The apparatus of claim 10, wherein selection of a first selector element presented on the UI and associated with the option configures a setting to automatically launch the application responsive to the first determination.

12. A method, comprising:

making a first determination that a device is being or has been transitioned between a first configuration and a second configuration;

presenting a first element on a touch-enabled display based on identification of a first user and in response to the first determination;

launching a first application associated with the first element based on the identification of the first user and in response to the first determination;

presenting a second element on the touch-enabled display based on identification of a second user different from the first user and in response to the first determination; and launching a second application associated with the second element based on the identification of the second user and in response to the first determination.

13. The method of claim 12, comprising:

presenting a user interface (UI) on the touch-enabled display, the UI comprising an option enabling selection of one or more applications associated with respective elements presentable on the touch-enabled display;

wherein based on selection from the UI of the one or more applications, the respective elements are presented on the touch-enabled display in response to the first determination.

14. The method of claim 12, comprising:

presenting a user interface (UI) on the touch-enabled display, the UI comprising an option to configure a setting regarding whether to automatically launch the first application in response to the first determination.

15. The apparatus method of claim 14, wherein selection of a first selector element presented on the UI and associated with the option configures a setting to automatically launch the first application in response to the first determination.

16. An apparatus, comprising:

a processor; and storage accessible to the processor and bearing instructions executable by the processor to:

determine a change in physical orientation of a first portion of the apparatus relative to a second portion of the apparatus;

change the appearance of an element presented on a display responsive to the determination of a change in physical orientation of the first portion relative to the second portion; and present a user interface (UI) on the display, the UI comprising an option enabling selection of one or more applications associated with respective elements presentable on the display;

wherein based on selection from the UI of the one or more applications, the respective elements are presented on the display responsive to the determination of the change in physical orientation of the first portion relative to the second portion.

17. The apparatus of claim 16, further comprising:

a first panel at least bearing a touch-enabled display, the first portion comprising the first panel;

a second panel at least bearing a keyboard, the second portion comprising the second panel.

18. The apparatus of claim 16, wherein the determination of the change in physical orientation of the first portion relative to the second portion is executed at least in part based on input from a motion sensor.

19. The apparatus of claim 16, wherein the UI is a first UI, and wherein the instructions are executable by the processor to:

present a second UI on the display, the second UI comprising an option to configure a setting regarding whether to automatically launch a first application responsive to the determination of the change in physical orientation of the first portion relative to the second portion.

20. The apparatus of claim 19, wherein selection of a first selector element presented on the second UI and associated with the option configures a setting to automatically launch the first application responsive to the determination of the change in physical orientation of the first portion relative to the second portion.

* * * * *